C. H. JACKSON.
PISTON PACKING FOR DEEP WELLS.
No. 49,759.                                     Patented Sept. 5, 1865
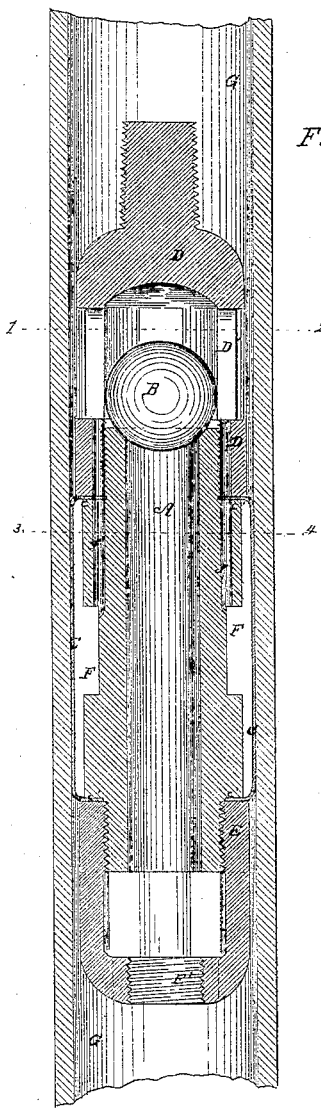
Fig. I
Charles H. Jackson, INVENTOR
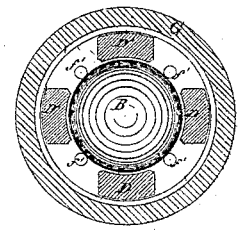
Fig. II
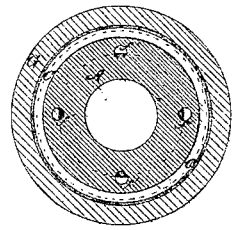
Fig. III
B. H. Muehle
Chs. McCarthy.       } WITNESSES.

UNITED STATES PATENT OFFICE.

CHARLES H. JACKSON, OF ANGOLA, NEW YORK.

IMPROVEMENT IN PISTON-PACKING FOR DEEP WELLS.

Specification forming part of Letters Patent No. 49,759, dated September 5, 1865.

*To all whom it may concern:*

Be it known that I, CHARLES H. JACKSON, of Angola, in the county of Erie and State of New York, have invented a certain new and Improved Pump-Piston and Packing for Oil-Well and other Pumps; and I do hereby declare that the following is a full, clear, and exact description thereof, reference being had to the accompanying drawings, making a part of this specification, in which—

Figure I is a longitudinal section of my improvement as applied to the piston of lifting-pumps commonly in use in oil-wells. Fig. II is a cross-section of same on line 1 2 of Fig. I. Fig. III is also a cross-section on line 3 4 of Fig. I.

The nature of this invention consists in the combination of an expansible packing-shell, of leather or other suitable material, with a piston-head so constructed as to leave an annular space between it and the packing-shell, communicating by small channels with the supported column of fluid, so that the pressure or weight of such column will forcibly expand the packing-shell outwardly against the pump-barrel and cause the piston to work tightly and efficiently therein.

Letters of like name and kind refer to like parts in each of the figures.

A represents the piston-head, which is hollow to admit the passage of the liquid through it, and is provided with a valve, B, at its upper end, as common in this class of pumps.

C represents a cylindrical packing-shell of leather, which surrounds and is secured to the piston-head at each end by inward flanges firmly clamped, as shown at C', between shoulders on the piston-head and screw followers or nuts D E, thus rendering the shell capable of slight radial expansion between the points of its connection to the piston-head. The diameter of this packing-shell, when made of leather, should be nearly or quite that of the pump-barrel, so as to require little or no stretching to permit it to be forced into close contact with the pump-barrel. Where the nature of the liquid being pumped will permit, india-rubber or other elastic material may be used in preference to the leather. The upper nut or follower, D, is arched or ribbed over, as shown at D', forming a guard and guide to the valve B and supporting the screw-shank $D^2$, by which the piston is secured to the pump-rod. The lower nut or follower, E, is also arched over in the same manner, with a screw-socket, E', used for taking hold of the foot-valve to remove it from the well—a common construction in this class of pumps.

A groove is turned around the piston, forming the annular space F between the piston and packing-shell, which is made to communicate with the bore of the pump-barrel above the packing by the small holes $f'$, so that the annular space is filled by the liquid entering through these holes, which will produce an equal and uniform radial expansion of the packing-shell against the pump-barrel, the amount or force of such expansion bearing direct proportion to the weight or pressure of the liquid column supported by the piston, so that the absolute contact of every part of the surface of the packing with the pump-barrel is insured and a perfect and efficacious action of the piston secured. Further, all wear of the packing-shell by friction is constantly compensated for, and great durability in the device obtained.

The pump-barrel is shown at G.

Having now fully described my invention, what I claim as new is—

The combination of an expansible packing-shell, C, made of leather or other suitable material, with a piston-head, A, so constructed as to form an annular space between it and the packing-shell, which annular space communicates by means of small channels with the rising column of fluid, so that the pressure of such column of fluid will expand the packing-shell outwardly against the pump-barrel, substantially as described.

CHARLES H. JACKSON.

Witnesses:
CHAS. MCCARTHY,
B. H. MUEHLE.